April 23, 1957 G. R. MAY 2,789,459
PHOTOGRAPHIC ENLARGER
Filed March 25, 1954 4 Sheets-Sheet 1
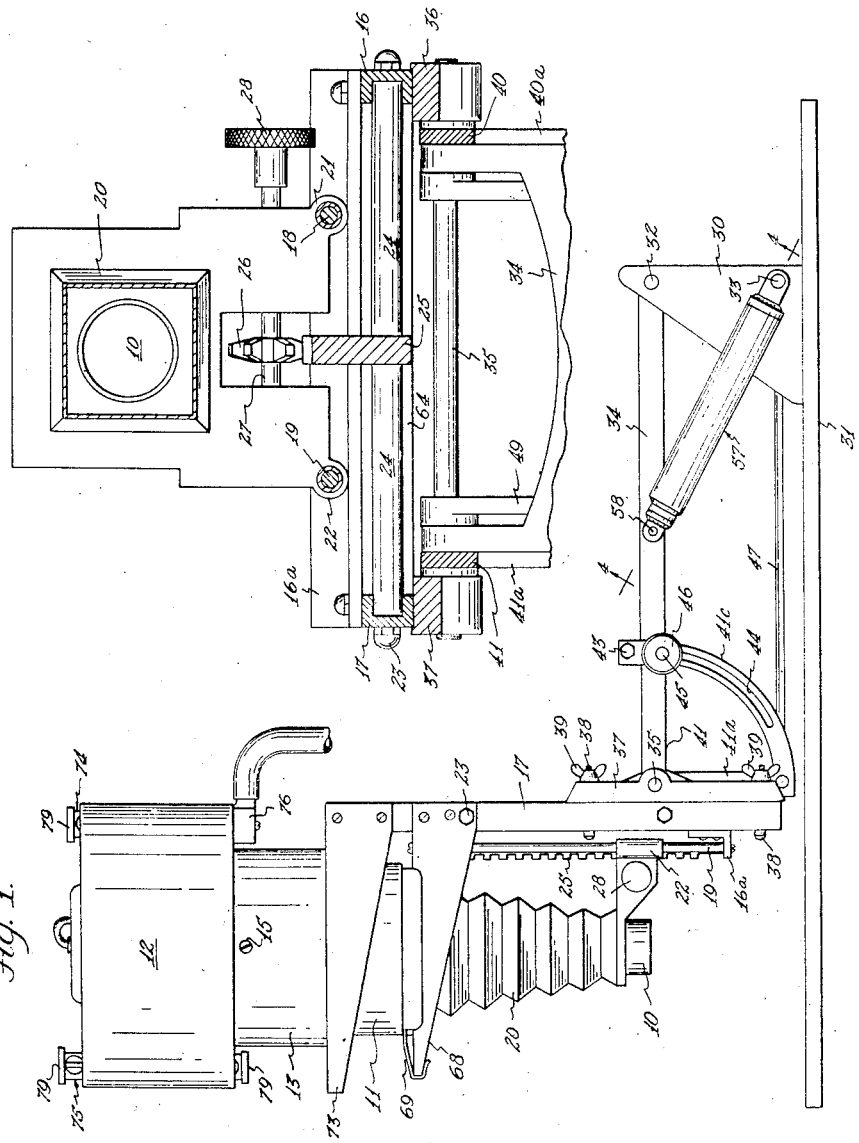
INVENTOR.
George R. May
BY
Atty.

April 23, 1957  G. R. MAY  2,789,459
PHOTOGRAPHIC ENLARGER
Filed March 25, 1954  4 Sheets-Sheet 2
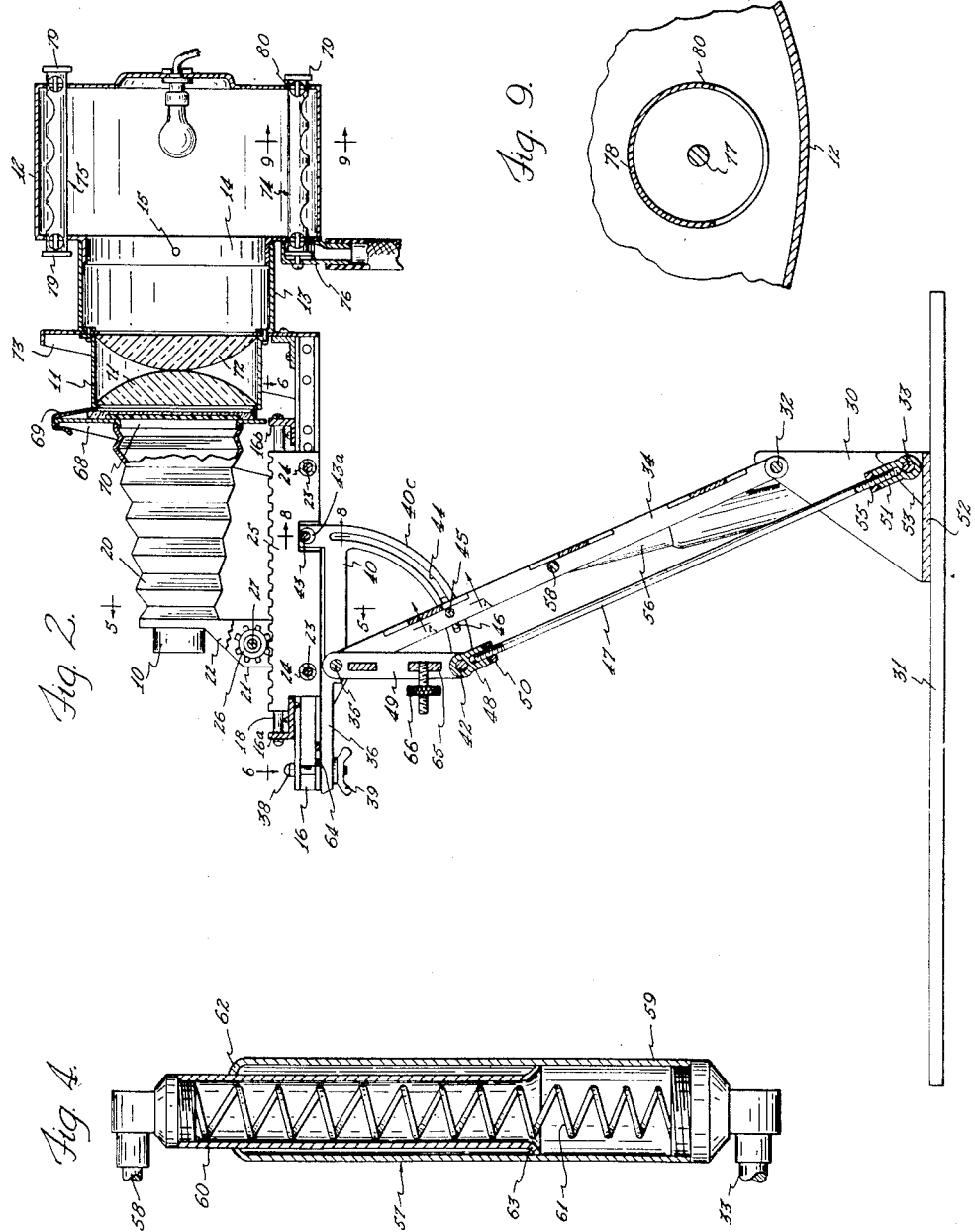
INVENTOR.
George R. May
BY
*Atty.*

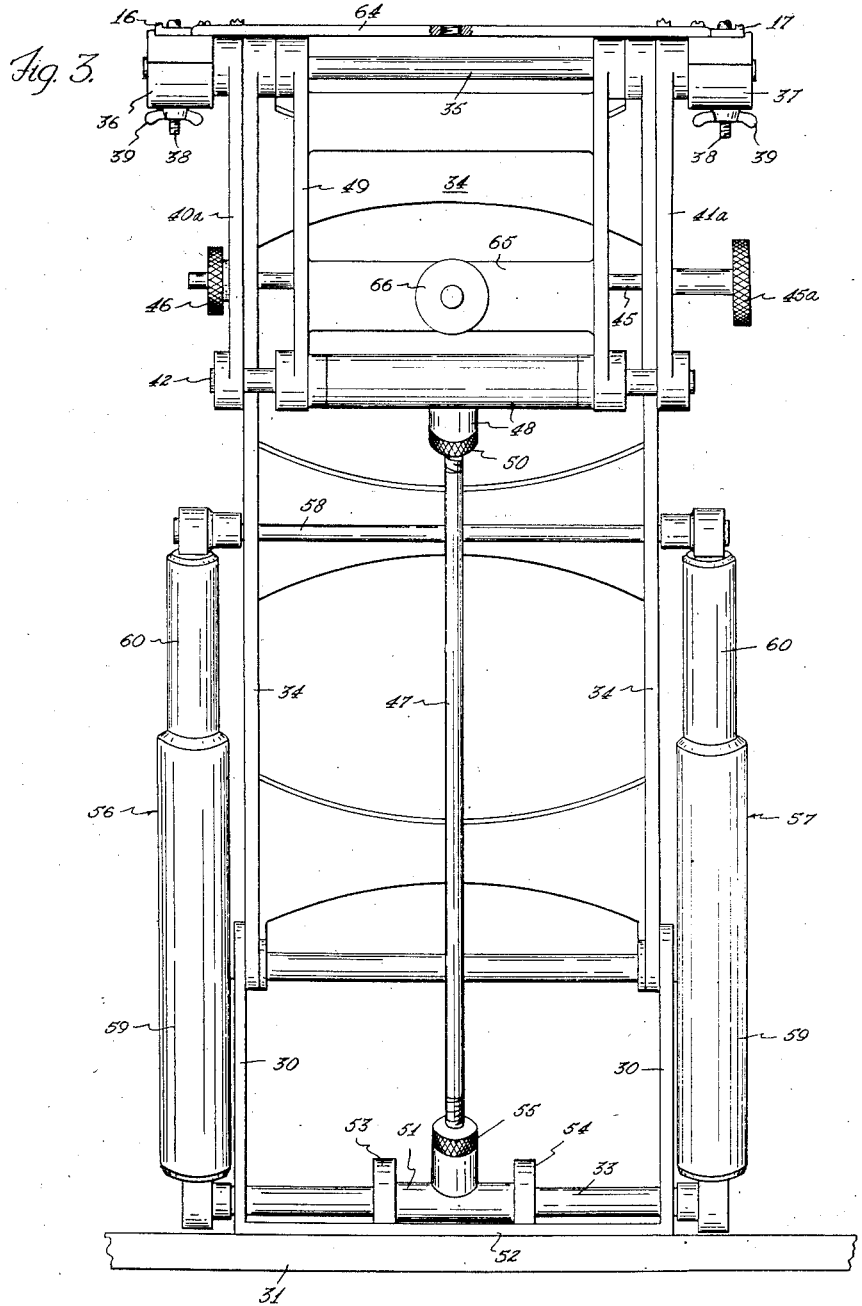

April 23, 1957 G. R. MAY 2,789,459
PHOTOGRAPHIC ENLARGER
Filed March 25, 1954 4 Sheets-Sheet 4

INVENTOR.
George R. May
BY
*Fred Wells*
Atty.

United States Patent Office 2,789,459
Patented Apr. 23, 1957

2,789,459

PHOTOGRAPHIC ENLARGER

George R. May, San Francisco, Calif., assignor of one-half to Jean Miller May, San Francisco, Calif.

Application March 25, 1954, Serial No. 418,568

2 Claims. (Cl. 88—24)

The present invention relates to an improved photographic enlarger. It is the principal purpose of the invention to provide an enlarger which combines the projection apparatus and a support therefor in such a manner that the projection apparatus may shift up and down and the projection may be made in a horizontal or vertical direction to provide any desired degree of enlargement, while effective cooling of the projection lamp housing is retained.

More particularly it is a purpose of my invention to provide an enlarger with support means operable to hold the projection axis of the enlarger truly in either vertical or horizontal position through a wide adjustment range of the support height. In the use of photographic enlarging apparatus, it is essential to maintain accurate rectilinear relations between the enlarger lens assembly and the projection surface throughout the range of variation in the size of enlargement that the operator may wish to employ. Otherwise the operator is forced to employ levelling and aligning devices in order to be sure that accurate rectilinear relation of projector to projection surface is obtained. An enlarger embodying my invention provides for obtaining various sizes of projected images at the base of the enlarger while maintaining the projection axis vertical to the base without further adjustment. The limit in size of enlargement is the height of support. Beyond this limit, enlargement may be expanded to any practical desired limit by utilizing the same mechanism to establish the projection axis on a horizontal line and projecting upon a vertical screen spaced the desired distance from the projecting apparatus. My apparatus accomplishes this by simply rotating the projection apparatus on the support to stops that establish the projection axis in horizontal position. Thereafter the support provides vertical adjustment of the projection apparatus while maintaining the horizontal position of the axis.

The nature and advantages of my invention will appear more fully from the following description and the accompanying drawings which illustrate a preferred form of the invention. It should be understood, however, that the drawings and description are illustrative and are not intended to limit the scope of the invention. Various changes in the details of construction may be made within the scope of the invention defined by the claims.

In the drawings:

Figure 1 is a view in side elevation showing the enlarger positioned with the projection axis vertical, the enlarger being close to the projection surface so that the size of the projected image will be small;

Figure 2 is a longitudinal sectional view with certain parts in side elevation, and showing the enlarger positioned with the projection axis horizontal, the entire enlarger being raised by the support a substantial distance above the base;

Figure 3 is an enlarged front view of the supporting mechanism of the enlarger as it would appear when viewed from the left of Figure 2;

Figure 4 is a fragmentary sectional view taken on the line 4—4 of Figure 1;

Figure 5 is a sectional view taken on the line 5—5 of Figure 2;

Figure 9 is a sectional view on an enlarged scale, taken on the line 9—9 of Figure 2.

Figure 6:
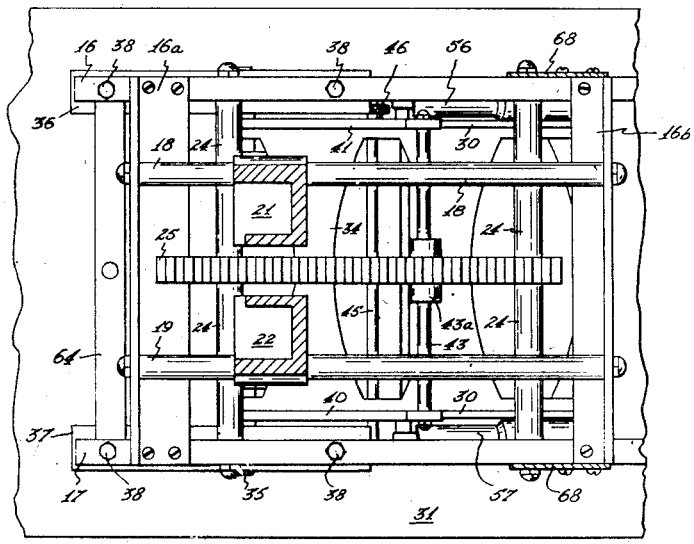
Figure 6 is a plan sectional view taken on the line 6—6 of Figure 2.
Figure 7:
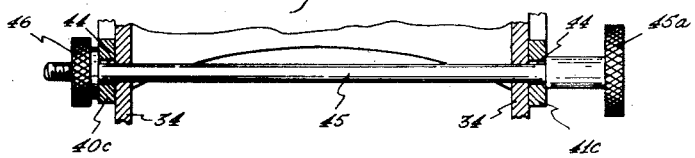
Figure 7 is an enlarged fragmentary sectional view taken on the line 7—7 of Figure 2.
Figure 8:
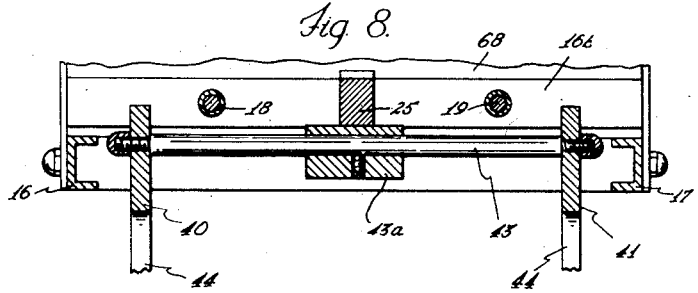
Figure 8 is an enlarged fragmentary sectional view taken on the line 8—8 of Figure 2.

Referring now in detail to the drawings, my invention utilizes an enlarger which embodies a projector lens unit 10, a condenser lens unit 11, and a light housing 12. The light housing 12 is separably mounted on the condenser lens unit 11 by a tubular portion 13 on the condenser lens unit and a corresponding tubular portion 14 on the lamp housing which telescope together and are secured by screws 15. The units 10 and 11 are mounted on two side frame pieces 16 and 17 which also support guide rods 18 and 19 on which the front lens unit 10 is slidably mounted by supporting brackets 21 and 22. The side frames 16 and 17 are connected by spacer rods 23 which support a toothed bar 25. Spacer tubes 24 on the rods 23 position the bar 25 midway between the side frames 16 and 17. The bar 25 is utilized to expand and contract the bellows 20 between the unit 10 and the unit 11. A pinion 26 is mounted on a shaft 27 that is journalled in the brackets 21 and 22. The pinion 26 meshes with the rack 25 and is turned by a hand wheel 28 to move the brackets 21 and 22 on the rods 18 and 19. The rods 18 and 19 are mounted on two cross pieces 16a and 16b that are secured on the frames 16 and 17.

The enlarger just described is mounted upon a base in such a manner that it may be adjusted vertically and may be set with its projection axis either vertical or horizontal in all positions of adjustment. The particular mechanism by which the adjustment is obtained comprises a substantially U-shaped casting 30 which is mounted upon a suitable base board 31. This casting 30 has a cross rod 32 at the top of its legs and another cross rod 33 adjacent to its base. The two rods 32 and 33 are vertically aligned. A frame 34 is pivoted on the rod 32 at one end and has its other end pivoted on a cross rod 35 which connects two mounting bars 36 and 37 that support the side frame members 16 and 17. Bolts 38 and wing nuts 39 fasten the bars 36 and 37 to the side frames 16 and 17 so that the projector unit can be separated from the support for packing and transportation. Two quadrant shaped castings 40 and 41 are mounted on the cross rod 35 just inside the bars 36 and 37. These quadrant shaped castings 40 and 41 are also secured to each other by two cross tie rods 42 and 43. The castings have their circular segments 40c and 41c provided with elongated slots 44 which receive a cross member 45 that passes through the frame 34 and is extended through the slots 44. The cross member 45 has a hand piece 45a at one end and a member 46 is threaded on the other end. The member 46 can be tightened to clamp the cross member 45 in any fixed position along the slots 44. Between the sides of the frame 34 the rods 35 and 42 are connected by a spacing frame 49.

The distance from the center of the cross rod 35 to the center of the cross rod 42 is equal to the distance between the rods 32 and 33 on the base casting 30. The cross rod 42 is connected to the rod 33 by a rigid connecting member 47. A pivot block 48 is pivoted on the rod 42 midway between its ends and is held in this mid position by the spacer 49. The upper end of the member 47 is threaded into the block 48 and is secured in position by a lock nut 50. A similar pivot block 51 is mounted at the mid point of the rod 33 between two spacer lugs 53 and 54 on the base portion 52 of the casting 30. The member 47 is threaded into the block 51 and is locked in position by a lock nut 55. The member 47 has right hand threads at one end and left hand threads at the other and the blocks 48 and 51 are correspondingly threaded so that in the original adjustment the distance between the rods 42 and 33 can be adjusted exactly to equal the distance between the rods 35 and 32. The frame 34 and the member 47 with their connections through the cross rods 32, 33, 35 and 42 provide a parallelogram support for the quadrant shaped members 40 and 41; utilizing the legs of the base member 30 and those portions 40a and 41a of the quadrants 40 and 41 to complete the parallelogram. In addition, the provision of the single member 47 midway between the side portions of the frame 34 prevents any twist distortion in the assembly.

The weight of the enlarging apparatus carried on the frame 34 is counterbalanced by two spring units 56 and 57. These two spring units have their lower ends secured on the ends of the rod 33 which are extended beyond the base 30. The upper ends of the units are pivoted on a cross shaft 58 which extends through the frame 34. The spring units are identical in construction. Each unit comprises a lower tubular member 59 and an upper tubular member 60 telescoping with each other, together with a coiled spring 61 under compression within the two tubular members 59 and 60. The upper end of the member 59 is turned in as indicated at 62 and the lower end of the member 60 is flared outwardly as indicated at 63 so that the two members slide perfectly on each other and there is no possibility of the springs 61 catching on the open end of the member 60.

Figure 2 of the drawings shows the enlarger in horizontal position, that is, with its projection axis extending horizontally. By loosening the member 46, the enlarger can be lowered or raised while its axis is horizontal by the action of the frame 34 and the member 47 in combination with the base 30 and the quadrants 40 and 41. Figure 1 shows the enlarger with its axis vertical and it is obvious that the enlarger may be adjusted vertically between the positions shown in Figures 1 and 2, regardless of whether its axis is horizontal or vertical.

When the axis of the enlarger is horizontal the cross rod 43 has an adjustable eccentric 43a thereon which engages against the bottom of the rack 25 to serve as a means to stop the enlarger parallel to the base 31 of the support. In order to hold the enlarger with its projection axis vertical, the mounting bars 36 and 37 have a cross bar 64 connecting them near their front ends and the spacing member 49 has a cross bar 65 located near the cross rod 42. A right and left hand threaded member 66 having a knurled center head, is inserted in properly threaded openings in the bars 64 and 65 to draw them together and secure the enlarger in vertical position.

Referring now to the detailed construction of the enlarger, the rear end of the bellows 20 is supported by a frame 68. This frame also slidably mounts a carrier 69 which holds the transparency to be projected between the window 70 at the rear of the bellows 20 and the condenser lens unit 11. The condenser lens unit 11 contains two plano-convex lenses 71 and 72. The unit 11 is supported by a frame 73 which also carries the larger cylinder 13 that telescopes with the portion 14 of the lamp housing 12.

In order to provide adequate cooling of the lamp housing 12 in both horizontal and vertical positions, I provide the housing 12 with air distributing units 74 and 75 which extend parallel to the axis of the projections and which are diametrically opposite each other on the lamp housing. The air distributing unit 74 is provided at the end closest to the cylinder 13 with an air hose connection 76 through which cooling air may be supplied from a fan or other source. The member 74 is made up of a central rod 77 and a fluted cylinder 78 around it, the cylinder being held on the rod by two heads 79. The housing 12 has apertures 80 to receive the member 74 so that both ends of the member 74 project beyond the housing 12. The air hose connection 76 is a coupling member which is adapted to slide over the head 79 and fit against the lamp housing 12 around the aperture 80 so as to direct the air from the hose connection 76 into the housing 12. The fluted cylinder 78 will cause the air to be distributed throughout the housing 12. When the axis of the enlarger is horizontal, the air moves upwardly from the unit 74 and is discharged through the unit 75, which is identical in construction to the unit 74. When the enlarger has its projection axis vertical, then the air forced into the lamp housing moves across the housing and is discharged through the unit 75. The unit 74 is set down to close it at the top end and the unit 75 is set up so as to provide maximum cross flow of the cooling air.

It is believed to be evident from the foregoing description and the accompanying drawings that I have provided an enlarger and a support therefor wherein the enlarger has a range from very close to zero enlargement when in the position shown in Figure 1, to almost any desired size of enlargement. The range is increased when the maximum enlargement on a vertical axis is exceeded, by simply shifting the enlarger from a vertical projection axis to a horizontal projection axis, and using a projection surface spaced the desired horizontal distance away from the lens unit 10. The construction is such that in all positions of the enlarger, the proper rectilinear relation of the projection axis to the projection surface is readily obtained without using any leveling devices or adjustments. The same mechanism which provides for more or less enlargement when the projection axis is vertical, supports the enlarger and provides up and down adjustment when the projection axis is horizontal. The lamp cooling apparatus is so constructed and arranged as to operate efficiently in both positions of the enlarger. It is also believed to be evident that I have provided an enlarger wherein the matter of carrying the enlarger is simplified by connecting the support, the lens unit and the lamp unit of the enlarger in such a fashion that they may be quickly separated and placed in one unit case for transportation. The supporting mechanism makes one unit and is separable from the side frames 16 and 17 by the removal of the four wing nuts and the connecting bolts. The lamp unit readily separates from the lens unit by removal of the screws 15. No particular tools or measuring equipment is necessary to reset the enlarger when it is put together again.

It is believed that the nature and advantages of my invention will be clear from the foregoing description.

Having thus described my invention, I claim:

1. In a photographic enlarger having a projection lens unit, a condenser lens unit and a lamp housing, a main frame, a second frame mounting the condenser lens unit on said main frame, a tube at one side of the condenser lens unit removably supporting the lamp housing, a carrier at the other side of the condenser lens unit for mounting a transparency to be enlarged, a light shielding bellows connecting the projector lens unit and the condenser lens unit, guides mounting the projection lens unit on the frame for sliding movement toward and away from the condenser lens unit, a base, an adjustable parallelogram support having a lower end thereof vertical to the base and secured thereon, the support having the top of its upper end pivoted to the main frame, the upper side of the support comprising a rigid frame pivoted to the top of said end of the support, supporting members for said main frame spaced laterally from the top of said upper end of the parallelogram support toward the condenser lens unit and fixed to said upper end, slotted circular segments extending from the supporting members to the bottom of said upper end, a cross rod extending through the segment slots and carried by the rigid frame, and means on the rod to secure it against movement along the segment slots.

2. A parallelogram support mechanism for photographic enlargers comprising a base having two upper pivots spaced apart, a rectangular frame having one end mounted by said pivots, said base having a lower pivot midway between the upper pivots, a rod mounted by the lower pivot, a cross tie rod at the top of the frame, mounting bars pivoted on the cross tie rod at the top of the rectangular frame and having means to mount a photographic enlarger, a pair of quadrant shaped castings also pivoted on said cross tie rod, a cross rod connecting the lower ends of said castings, the first named rod being pivoted to said cross rod, the castings having slotted circular segments, the rectangular frame having a cross member thereon extending through the slots, means on said cross member for clamping the circular segments to the frame, connecting means for the mounting bars spaced from the cross tie rods and means between the cross rod and the cross tie rod for securing the connecting means.

References Cited in the file of this patent

UNITED STATES PATENTS

| 1,633,228 | Robers | June 21, 1927 |
| 2,176,625 | Friedman | Oct. 17, 1939 |

FOREIGN PATENTS

| 805,590 | Germany | May 25, 1951 |